(12) United States Patent
Heemskerk et al.

(10) Patent No.: US 7,388,826 B2
(45) Date of Patent: Jun. 17, 2008

(54) OPTICAL RECORDING MEDIUM CAPABLE OF RECORDING THREE DATA VALUES

(75) Inventors: Jacobus Petrus Josephus Heemskerk, Eindhoven (NL); Cornelis Marinus Schep, Eindhoven (NL); Aalbert Stek, Eindhoven (NL); Hiromichi Ishibashi, Ibaraki (JP); Shigeru Furumiya, Himeji (JP); Shoei Kobayashi, Tokyo (JP); Jun Nakano, Tokyo (JP)

(73) Assignees: Koninklijke Philips Electronics N.V., Eindhoven (NL); Matsushita Electric Industrial Co., Ltd., Osaka (JP); Sony Corporation, Tokyo (JP)

( * ) Notice: Subject to any disclaimer, the term of this patent is extended or adjusted under 35 U.S.C. 154(b) by 573 days.

(21) Appl. No.: 10/487,600

(22) PCT Filed: Oct. 18, 2002

(86) PCT No.: PCT/JP02/10814

§ 371 (c)(1),
(2), (4) Date: Oct. 6, 2004

(87) PCT Pub. No.: WO03/036629

PCT Pub. Date: May 1, 2003

(65) Prior Publication Data

US 2005/0036438 A1 Feb. 17, 2005

(30) Foreign Application Priority Data

Oct. 19, 2001 (JP) ............................. 2001-322044

(51) Int. Cl.
*G11B 7/24* (2006.01)

(52) U.S. Cl. .................................................. 369/275.4
(58) Field of Classification Search ...................... None
See application file for complete search history.

(56) References Cited

U.S. PATENT DOCUMENTS 4,999,825 A    3/1991   Raaymakers et al.

(Continued)

FOREIGN PATENT DOCUMENTS

EP    0 751 508    1/1997

(Continued)

OTHER PUBLICATIONS

English Abstract for CN1035576A, published Sep. 13, 1989.

*Primary Examiner*—Tan Dinh
(74) *Attorney, Agent, or Firm*—Wenderoth, Lind & Ponack, LLP

(57) ABSTRACT

An optical disc medium 10 having a wobbled track groove 12 includes three wobble patterns including a flat wobble pattern, a positive pulse wobble pattern, and a negative pulse wobble pattern. In the flat wobble pattern, the amplitude of the wobble from the lengthwise direction of the track groove is zero such that the track groove is flat. In the positive pulse wobble pattern, the amplitude of the wobble from the length-wise direction of the track groove is positive such that the track groove is wobbled in a first direction perpendicular to the length-wise direction. Further, in the negative pulse wobble pattern, the amplitude of the wobble from the lengthwise direction of the track groove is negative such that the track groove is wobbled in a second direction opposite to the first direction. Then, three data values can be recorded using three distinctive wobble patterns.

2 Claims, 14 Drawing Sheets

U.S. PATENT DOCUMENTS

| | | | |
|---|---|---|---|
| 5,303,216 A * | 4/1994 | Shinoda et al. | 369/44.13 |
| 5,463,614 A * | 10/1995 | Morita | 369/275.4 |
| 5,537,373 A * | 7/1996 | Horikiri | 369/44.13 |
| 5,604,726 A * | 2/1997 | Karube | 369/275.4 |
| 5,615,205 A | 3/1997 | Belser | |
| 5,715,217 A * | 2/1998 | Fuji | 369/44.26 |
| 5,820,795 A * | 10/1998 | Takemori et al. | 264/1.36 |
| 5,844,883 A * | 12/1998 | Kanno et al. | 369/53.29 |
| 5,991,259 A * | 11/1999 | Nakayama et al. | 369/275.4 |
| 6,233,219 B1 * | 5/2001 | Hori et al. | 369/275.4 |
| 6,853,615 B1 * | 2/2005 | Spruit et al. | 369/275.4 |

FOREIGN PATENT DOCUMENTS

| | | |
|---|---|---|
| EP | 0 930 611 | 7/1999 |
| EP | 0 939 398 | 9/1999 |
| JP | 2-172039 | 7/1990 |
| JP | 3-237631 | 10/1991 |
| JP | 3-237657 | 10/1991 |
| JP | 8-235593 | 9/1996 |
| JP | 9-115144 | 5/1997 |
| JP | 10-241167 | 9/1998 |
| JP | 2001-209937 | 8/2001 |
| WO | 99/34359 | 7/1999 |
| WO | 00/43996 | 7/2000 |

* cited by examiner

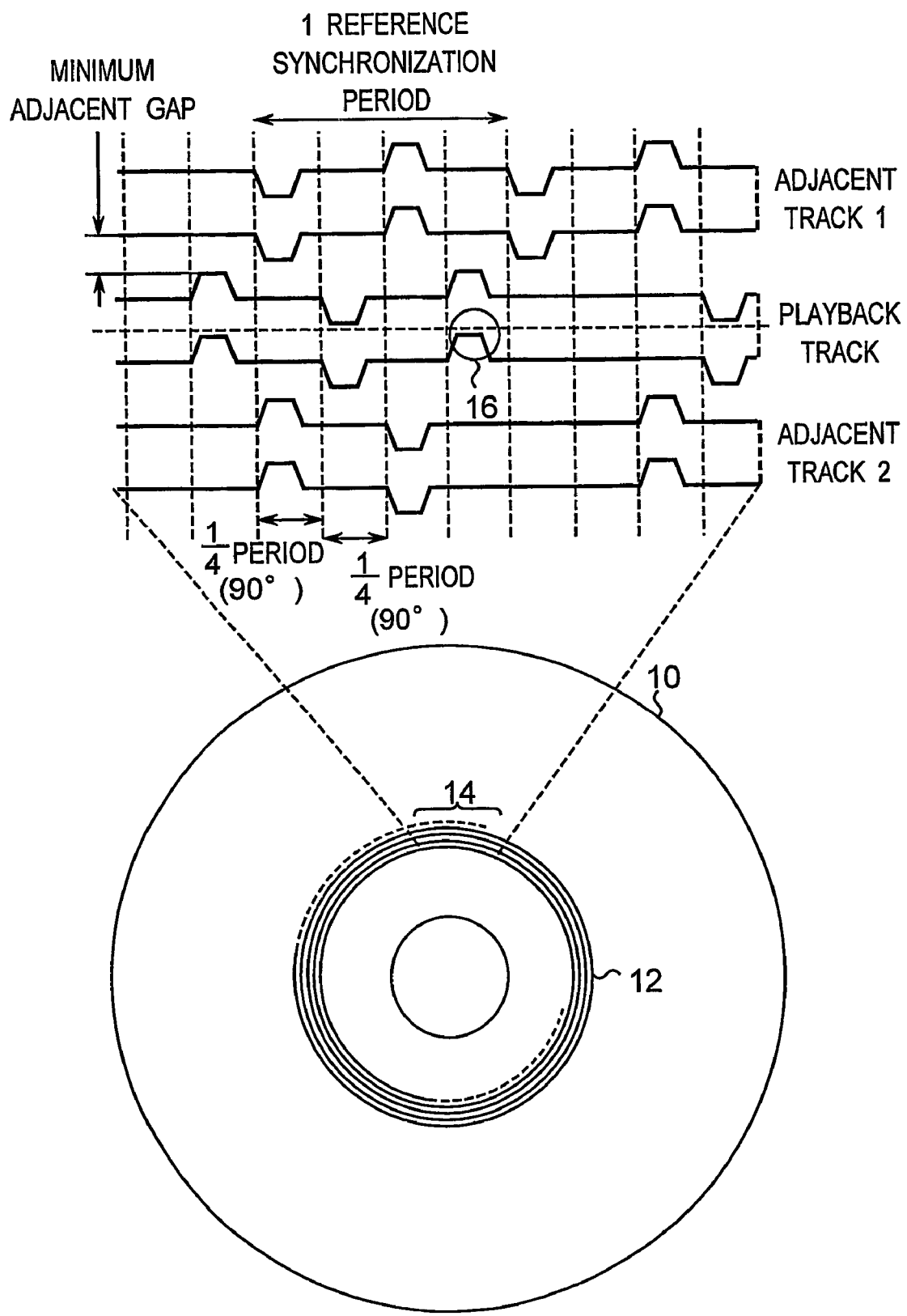

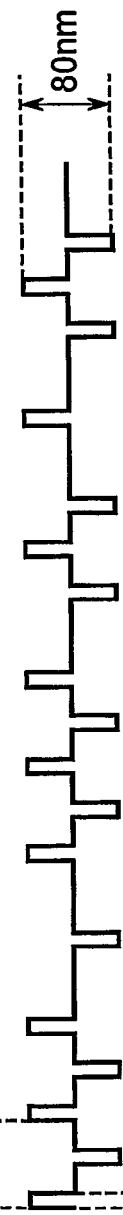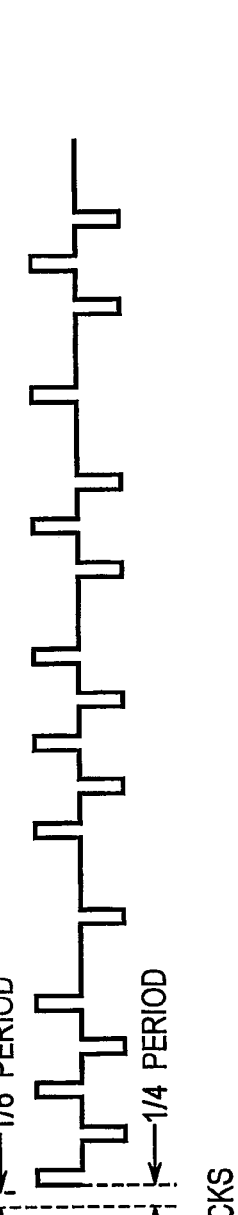

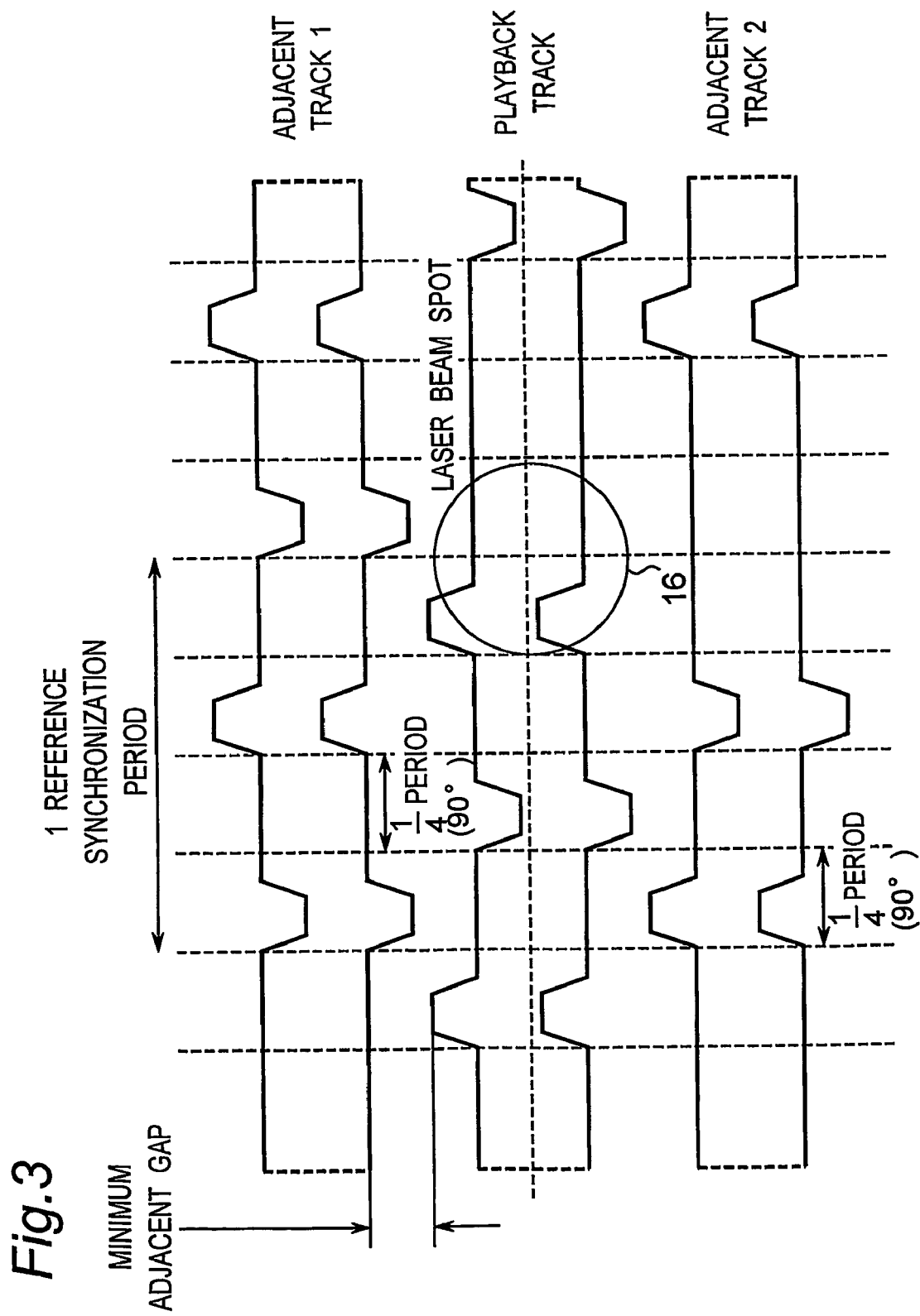

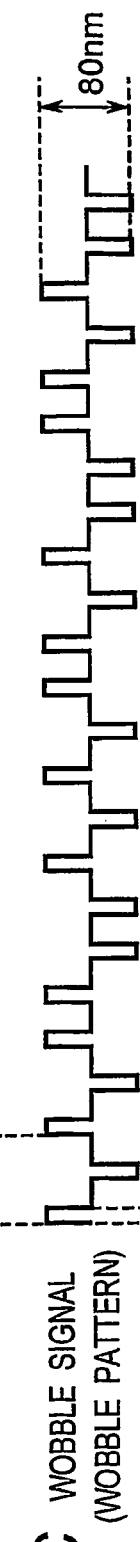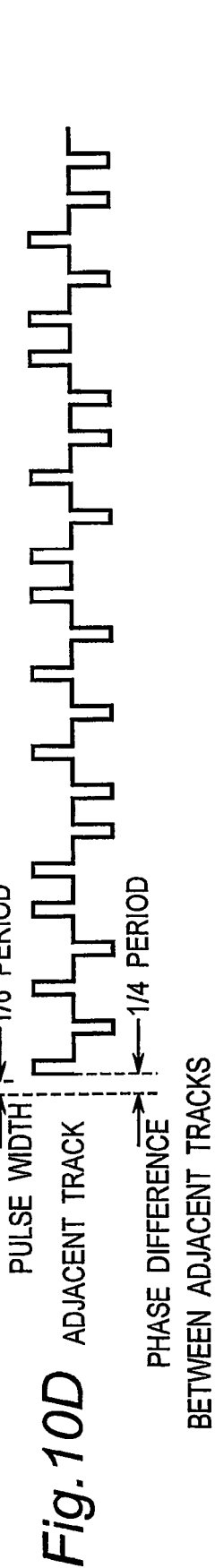

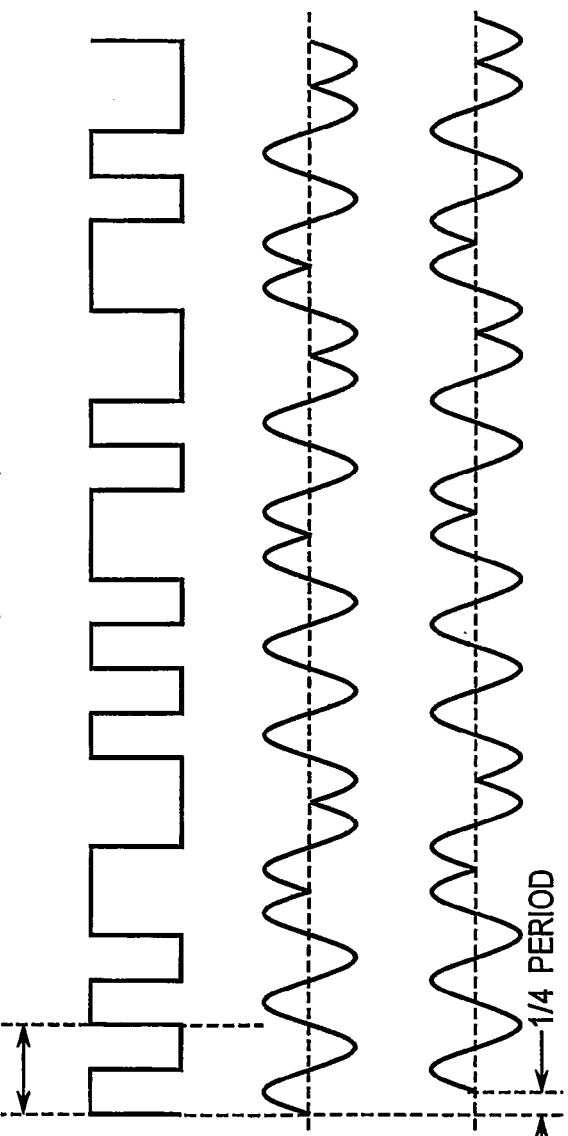
Fig.11A DATA
Fig.11B FM SIGNAL
Fig.11C WOBBLE SIGNAL
Fig.11D ADJACENT TRACK

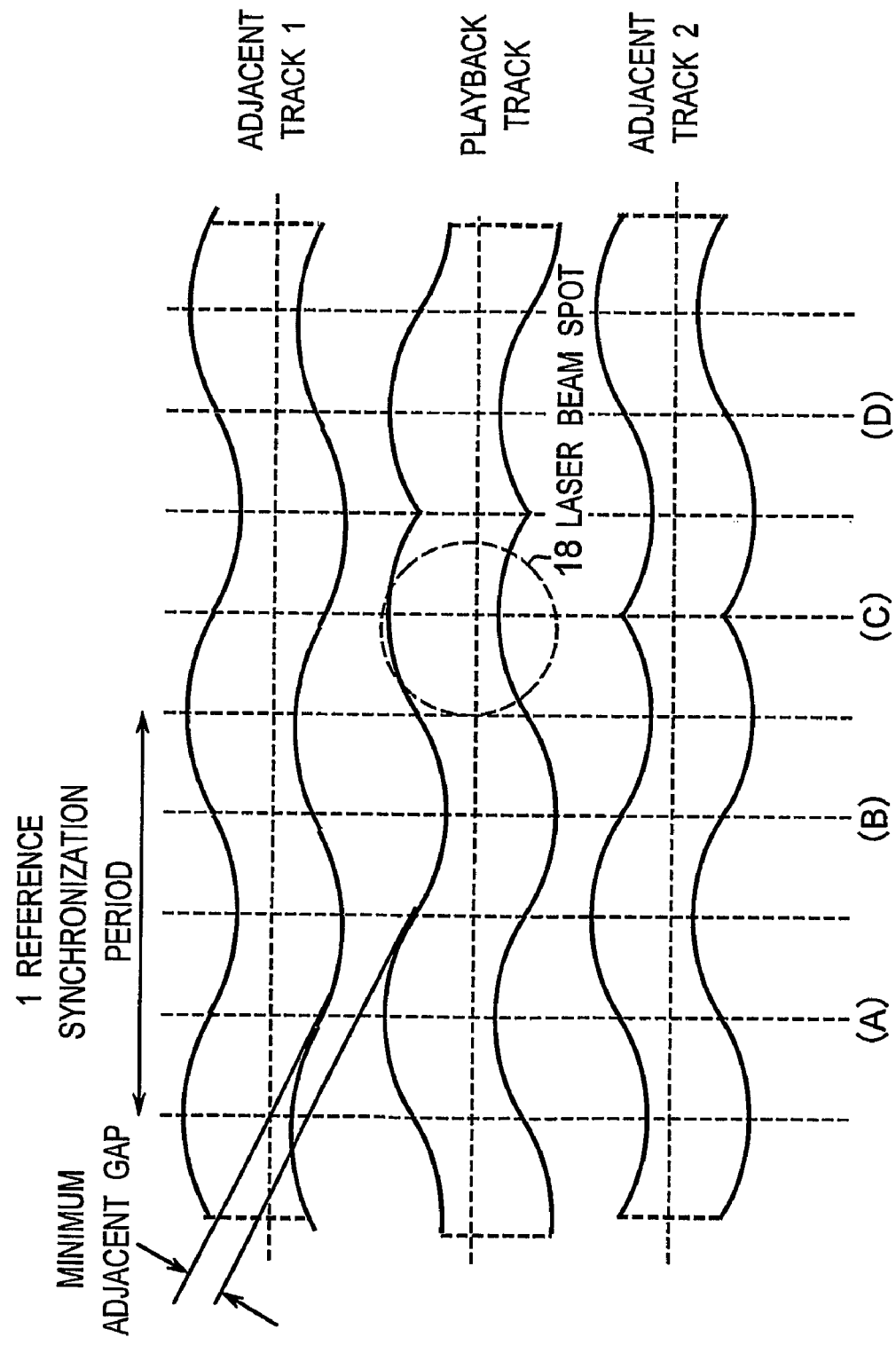

(INSIDE CIRCUMFERENCE :
 MANAGEMENT AREA)

(OUTSIDE CIRCUMFERENCE :
 DATA RECORDING AREA)

OPTICAL RECORDING MEDIUM CAPABLE OF RECORDING THREE DATA VALUES

TECHNICAL FIELD

The present invention relates to an optical disc medium for recording data in the shape of the track groove, a method for recording data to this optical disc medium, and a data recording apparatus. More particularly, the present invention relates to a data recording method for recording data to a management area at the inside circumference side of the optical disc medium.

BACKGROUND ART

An optical disc medium 50 normally has a track groove 52 travelling in a spiral from the inside circumference side to the outside circumference side of the disc while the radius of the spiral increases as shown in FIG. 14. The disc also normally has a management area with prerecorded data at the inside circumference side, and a data recording area at the outside circumference side. Optical disc media with a high recording density for handling video data, for example, are also in demand. As the recording density of optical disc media has increased, the management data recorded to the management area at the inside circumference side has also increased dramatically, and high recording density is also needed in the management area.

The area at the inside circumference side is limited, however, and high density recording of the management data using prepits as is done conventionally when the management data is voluminous leads to the problem of crosstalk between adjacent tracks.

SUMMARY OF THE INVENTION

Therefore, an object of the present invention is to enable high density recording of management data while suppressing crosstalk from adjacent tracks.

In accordance with one aspect of the present invention, there is provided an optical disc medium having a wobbled track groove which includes three wobble patterns including a flat wobble pattern, a positive pulse wobble pattern, and a negative pulse wobble pattern. In the flat wobble pattern, the amplitude of the wobble from the lengthwise direction of the track groove is zero such that the track groove is flat. In the positive pulse wobble pattern, the amplitude of the wobble from the lengthwise direction of the track groove is positive such that the track groove is wobbled in a first direction perpendicular to the lengthwise direction. Further, in the negative pulse wobble pattern, the amplitude of the wobble from the lengthwise direction of the track groove is negative such that the track groove is wobbled in a second direction opposite to the first direction. Then, three data values can be recorded using three distinctive wobble patterns.

It should be noted that the shape of the positive and negative pulse wobbles can be rectangular, trapezoidal, a circular arc, triangular, or other, and shall not be limited to a series of shapes.

Furthermore, an optical disc medium according to the present invention is an optical disc medium as described above wherein the pulse width of the positive pulse wobble pattern and the negative pulse wobble pattern is greater than or equal to the track groove width and is less than or equal to ¼ period of a reference signal recorded to the track groove wobble pattern.

The minimum pulse width is determined by the beam diameter for forming the track groove, that is, the width of the track groove is the minimum pulse width. Furthermore, to offset the signal part between adjacent track grooves, the maximum pulse width is the length of ¼ period or less of the wobble pattern. The pulse width is preferably in the range of ⅙ period to ¼ period of the wobble pattern.

Yet further, an optical disc medium according to the present invention is an optical disc medium as described above wherein the phase difference of the wobble patterns of adjacent first and second track grooves is greater than or equal to the pulse width and is less than or equal to ¼ period of the reference signal recorded to the wobble pattern.

Because the pulse width of the positive and negative pulse wobble patterns recording data is thus narrower than the original data signal by setting the phase difference in the wobble pattern part of the adjacent track grooves in the above-noted range, the recording parts recording data can be offset between adjacent track grooves. Crosstalk from adjacent track grooves can thus be suppressed. If the phase difference is narrower than the pulse width, recorded parts will overlap in adjacent track grooves, and the minimum pulse width is therefore preferably used.

An optical disc medium according to the present invention is characterized by having a first wobble pattern forming a wobble of a first frequency in a unit period to record first data; and a second wobble pattern forming a wobble of a second frequency in a unit period to record second data.

An optical disc medium according to the present invention is characterized by having a first wobble pattern with a first pulse projecting in the outside circumference direction and a second pulse projecting in the inside circumference direction in a single period for recording first data; and a second wobble pattern with a second pulse waveform of two consecutive pulses projecting in either the outside circumference direction or the inside circumference direction in a single period for recording second data.

Two wobble patterns can thus be formed by combining pulse shapes of a single frequency. For example, even if a sine wave shaped wobble is formed based on a two-value FM signal, it can be formed from two pulse waves with consecutive long wavelength parts without using waves of two different frequencies.

Furthermore, an optical disc medium according to the present invention is the above-noted optical disc medium wherein the phase difference between wobble patterns in adjacent first and second track grooves is effectively 90 degrees.

Furthermore, an optical disc medium according to the present invention is the above-noted optical disc medium characterized by having a constant angular velocity (CAV) format.

A data recording method for recording information to an optical disc medium according to the present invention is characterized by a wobble signal generating a wobble signal having at least one frequency from a data signal; displacing an optical axis of an optical head relative to the optical disc medium according to the wobble signal; and emitting light to the optical disc medium by means of the optical head to form a wobble pattern according to the wobble signal in a track groove on the optical disc medium.

A further data recording method according to the present invention is the above-described data recording method, wherein the wobble signal generating generates: a positive pulse with a positive amplitude and specific pulse width at a rising edge of the data signal; a negative pulse with a negative amplitude and a specific pulse width at a falling edge of the data signal; and a reference signal with 0 amplitude when there is no change in the data signal.

A further data recording method according to the present invention is the above-described data recording method wherein the pulse width is greater than or equal to the track groove width and is less than or equal to ¼ period of a reference signal recorded to the track groove wobble pattern.

A yet further data recording method according to the present invention is the above-described data recording method wherein the phase difference of the wobble patterns of adjacent track grooves is greater than or equal to the pulse width and is less than or equal to ¼ period of the reference signal recorded to the wobble pattern.

A yet further data recording method according to the present invention is the above-described data recording method, wherein the wobble signal generating generates: a first wobble signal of a first frequency for a first data signal; and a second wobble signal of a second frequency for a second data signal.

A yet further data recording method according to the present invention is the above-described data recording method wherein the wobble signal generating generates: a first wobble signal for a first data signal, the first wobble signal having a first pulse projecting upward or downward from a reference value, and a second pulse projecting downward or upward opposite the direction of the first pulse; and a second wobble signal for a second data signal, the second wobble signal having two consecutive pulses projecting in one direction either upward or downward from the reference value.

A yet further data recording method according to the present invention is the above-described data recording method wherein using a single frequency reference signal the wobble signal generating generates: a first wobble signal for the first data signal based on the waveform of one period of the reference signal; and a second wobble signal for the second data signal based on two consecutive same-sign waveforms inverting the sign of different-sign waveform parts in one period of the reference signal.

It is therefore possible to form two different wobble patterns by combining ½ wavelength pulses in a single frequency reference signal. For example, if a sine wave shaped wobble is formed based on a two-value FM signal, a wobble pattern with two frequencies can be formed using a single frequency reference signal instead of pulses of two different frequencies. More specifically, the long wavelength part of the FM signal can be formed using two consecutive pulses inverting different-sign wave parts in a single period of the reference signal.

A yet further data recording method according to the present invention is the above-described data recording method wherein the phase difference of wobble signals forming wobble patterns in adjacent first and second track grooves is effectively 90 degrees.

By making the phase difference of the wobble signal formed in a first track groove and an adjacent second track groove 90°, the pulses formed in the track groove can be offset and a sufficient gap can be obtained between adjacent tracks. Separation from the adjacent track groove is therefore sufficient, and crosstalk during signal detection can be suppressed.

A yet further data recording method according to the present invention is the above-described data recording method further including: a rotational synchronization signal generating a rotational synchronization signal synchronized to rotation of the spindle motor rotating the optical disc medium; and a reference signal generating a reference signal of which the frequency and phase have a specific relationship to the rotational synchronization signal; where the wobble signal generating generates a wobble signal of at least a first frequency synchronized to the reference signal.

A yet further data recording method according to the present invention is the above-described data recording method wherein for circumferential length R of a track groove on the optical disc medium and one reference period length T of the reference signals in one circumference of the track groove the following equation is true for integer n.

$$R = \left(n \pm \frac{1}{4}\right) \times T$$

A yet further data recording method according to the present invention is the above-described data recording method wherein the wobble signal generating includes: frequency modulating the data signal and generating a FM signal; and generating a wobble signal of at least a first frequency from the FM signal synchronized to the reference signal.

A data recording apparatus for recording information to an optical disc medium according to the present invention is characterized by including a wobble signal generator which generates a wobble signal of at least a first frequency from a data signal; an optical head which emits light to the optical disc medium to form a wobble pattern according to the wobble signal in a track groove; an optical head displacing arrangement which displaces an optical axis of the optical head relative to the optical disc medium according to the wobble signal; and a controller which controls the wobble signal generator, optical head displacing arrangement, and optical head; and recording information to the optical disc medium by forming a wobble pattern according to the wobble signal in the track groove of the optical disc medium.

A data recording apparatus is a data recording apparatus as described above further including: a spindle motor for rotating the optical disc medium; a rotational synchronization signal generator which generates a rotational synchronization signal synchronized to rotation of the spindle motor; and a signal synchronization arrangement which generates a reference signal of which the frequency and phase have a specific relationship to the rotational synchronization signal; where the wobble signal generator which generates a wobble signal of at least two values synchronized to the reference signal from the data signal.

A data recording apparatus is a data recording apparatus as described above further including: a frequency modulator which frequency modulates the data signal and generating a FM signal; the wobble signal generator which generates a wobble signal of at least a first frequency from the FM signal.

An optical disc medium according to the present invention selects and records one of three wobble patterns corresponding respectively to three data values as the wobble pattern part of a track groove. A specific phase difference is further provided in the wobble patterns of adjacent track grooves so that the data recording parts of adjacent track grooves are mutually offset. Because the width of the data recording parts can thus be made narrower than the original data signal and offset between tracks, crosstalk during playback can be suppressed.

An optical disc medium according to the present invention has a wobbled track groove, a first wobble pattern denoting a first data value by forming a wobble with a first frequency in a single period, and a second wobble pattern denoting a second data value by forming a wobble with a second frequency in a single period. More specifically, these two wobble patterns include a first wobble pattern having in one period a first pulse with a peak in the outside circumference side direction and a second pulse with a peak in the inside circumference side direction, and a second wobble pattern having two consecutive pulse peaks in the same direction, either toward the inside circumference or outside circumference, in the same period. A specific phase difference is imparted to the wobble patterns of adjacent track grooves, and the data recording parts are mutually offset in adjacent track grooves. As a result, crosstalk during playback can be suppressed because a specific phase difference is provided between adjacent tracks and the peak parts are mutually offset when the peak part of the pulse pattern is the data read point.

A data recording method for recording data to an optical disc medium according to the present invention generates a wobble signal with at least a first frequency from the data signal, displaces the optical axis of the optical head according to the wobble signal, and forms wobble patterns according to the wobble signal in the track groove. A specific phase difference is also provided when recording data to adjacent track grooves. As a result, because the width of the data recording parts of the wobble patterns formed in the track groove is narrower than the original data signal, a specific phase difference is provided between adjacent tracks and the data recording parts are mutually offset, crosstalk during playback can be suppressed.

A data recording apparatus for recording data to an optical disc medium according to the present invention has a reference signal generator which generates a reference signal of which the frequency and phase are in a specific relationship to the rotational synchronization signal of the optical disc medium, and a wobble signal generator which generates a wobble signal with at least a first frequency from a data signal synchronized to the reference signal. It is therefore possible to suppress crosstalk during playback because the width of the data recording parts of the wobble pattern formed in the track groove is narrower than the original data signal, a specific phase difference is provided between adjacent tracks, and the data recording parts are mutually offset.

BRIEF DESCRIPTION OF THE DRAWINGS

The present invention will become readily understood from the following description of preferred embodiments thereof made with reference to the accompanying drawings, in which like parts are designated by like reference numerals and in which:

FIG. 1 is an enlarged view of the wobble pattern in three adjacent track grooves;

FIG. 2A shows the data in the data signal;

FIG. 2B shows the FM signal obtained by frequency modulation of the data signal;

FIG. 2C shows the tristate wobble signal obtained by conversion from the FM signal, and shows the wobble pattern of the track groove in an optical disc medium according to a first embodiment of the present invention;

FIG. 2D shows wobble pattern in adjacent tracks;

FIG. 3 is an enlarged view showing the wobble pattern in three adjacent track grooves;

FIG. 10A shows the data of the data signal;

FIG. 10B shows the FM signal obtained by frequency modulation of the data signal;

FIG. 10C shows the tristate wobble signal obtained by conversion from the FM signal, and shows the wobble pattern of the track groove in an optical disc medium according to a variation of the first embodiment of the present invention;

FIG. 10D shows wobble pattern in adjacent tracks;

FIG. 11A shows the data of the data signal;

FIG. 11B shows the FM signal obtained by frequency modulation of the data signal;

FIG. 11C shows a two-value wobble signal obtained by conversion from the FM signal, and shows the wobble pattern of the track groove in an optical disc medium according to a second embodiment of the present invention;

FIG. 11D shows wobble pattern in adjacent tracks;

FIG. 12 is an enlarged view of the track groove in FIG. 11C and the wobble pattern of three mutually adjacent track grooves;

BEST MODE FOR CARRYING OUT THE INVENTION

Figure 4A:
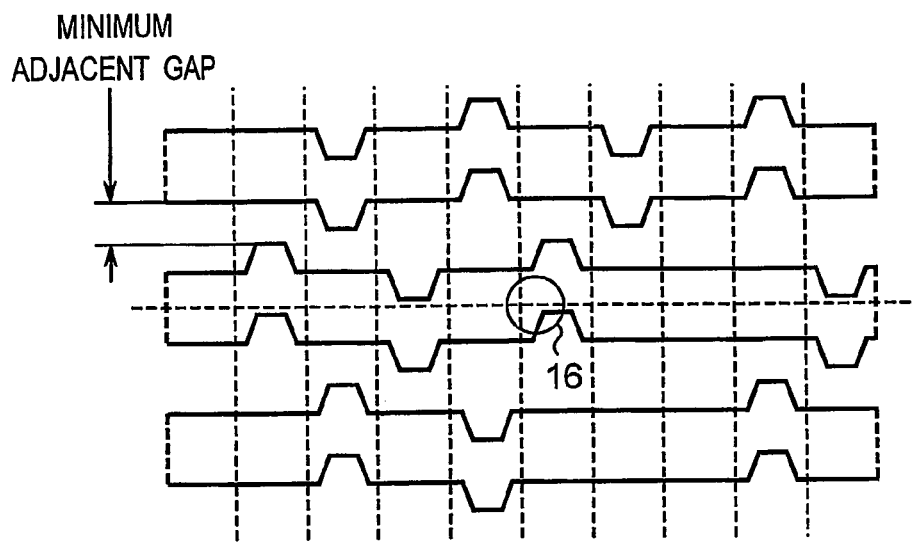
FIG. 4A is an enlarged view of adjacent track grooves in an optical disc medium according to a first embodiment of the present invention.

An optical disc medium according to preferred embodiments of the present invention is described below with reference to the accompanying figures.

An optical disc medium according to a first embodiment of the present invention is described using FIG. 1 to FIG. 4 and FIG. 9. As shown in FIG. 1, this optical disc medium 10 has a track groove (guide groove) 12 travelling in a spiral pattern from the inside circumference side to the outside circumference side while the radius of the spiral gradually increases. This optical disc medium 10 records information by selecting one of three wobble patterns respectively corresponding to three values as the wobble pattern causing the track groove to wobble. More specifically, the wobble patterns of three adjacent tracks are shown enlarged in FIG. 1. One of these three wobble patterns each corresponding to one of three values is selected to record data. If a first direction orthogonal to the lengthwise direction of the track groove is positive and a second direction opposite the first direction is negative, the wobble patterns are selected from the following three types.

(1) A flat wobble pattern with zero amplitude from the lengthwise direction of the track groove. In the flat wobble pattern, the track groove is flat.

(2) A positive pulse wobble pattern with positive amplitude from the lengthwise direction of the track groove. In the positive pulse wobble pattern, the track groove is wobbled in the first direction.

(3) A negative pulse wobble pattern with negative amplitude from the lengthwise direction of the track groove. In the negative pulse wobble pattern, the track groove is wobbled in the second direction The data recording parts recording information in these three wobble patterns are the positive pulse wobble and negative pulse wobble pattern parts, and the data recording parts are narrower than the data signal. Crosstalk between adjacent tracks due to the data recording parts is thus suppressed.

The pulse width of the positive pulse wobble pattern and the negative pulse wobble pattern is preferably equal to or greater than the track groove width and less than or equal to ¼ period of the reference signal recorded to the track groove wobble pattern. The width of the positive and negative pulse wobble patterns depends upon the recording beam diameter, and the minimum is determined by the width of the track groove formed with that beam diameter. Because the track groove width is approximately 160 nm, the minimum pulse width is approximately 160 nm. The maximum pulse width is preferably equal to or less than ¼ period of the reference signal so that there is no overlap between the positive and negative pulse wobble patterns between adjacent track grooves.

The mutual phase difference in the wobble patterns of adjacent tracks is ¼ period of the wobble pattern, that is, 90°, with this optical disc medium. By setting the phase difference of the wobble patterns in adjacent track grooves to 90°, the data recording parts recording data can be mutually offset between adjacent track grooves. Crosstalk from adjacent track grooves can thereby be suppressed. It should be noted that the phase difference set between adjacent track grooves shall not be limited to 90°, and must only be greater than or equal to the pulse width of the positive and negative pulse wobbles and less than or equal to ¼ period of the reference signal recorded to the wobble pattern as shown in FIG. 3.

The track groove of this optical disc medium and the wobble pattern formed in the track groove are described more specifically below. The track groove width is 160 nm and the track pitch is approximately 0.32 μm (320 nm) in this optical disc medium. Of the three different wobble patterns, the amplitude of the positive pulse wobble and negative pulse wobble can be from 30 to 50 nm from the edge of the track groove, and is preferably approximately 40 nm. The amplitude difference between the positive and negative pulse wobbles can be from 60 to 100 nm. In this case the gap between adjacent track grooves is 160 nm where there are no positive and negative pulse wobbles. When there are positive and negative pulse wobbles in the adjacent track grooves, an adjacent track gap of 110 to 160 nm can be assured because the positions of the positive and negative pulse wobbles in the data recording parts are mutually offset. Separation between adjacent track grooves is thus sufficient and crosstalk can be suppressed.

It should be noted that this optical disc medium is described recording data to three different wobble patterns by wobbling the track groove in the management area at the inside circumference side, but the invention shall not be so limited. Furthermore, data can also be recorded to three different wobble patterns in the track groove of the data recording area at the outside circumference side in the same way as described above. Data can also be recorded to a separate wobble pattern in the data recording area at the outside circumference side.

Figure 5:
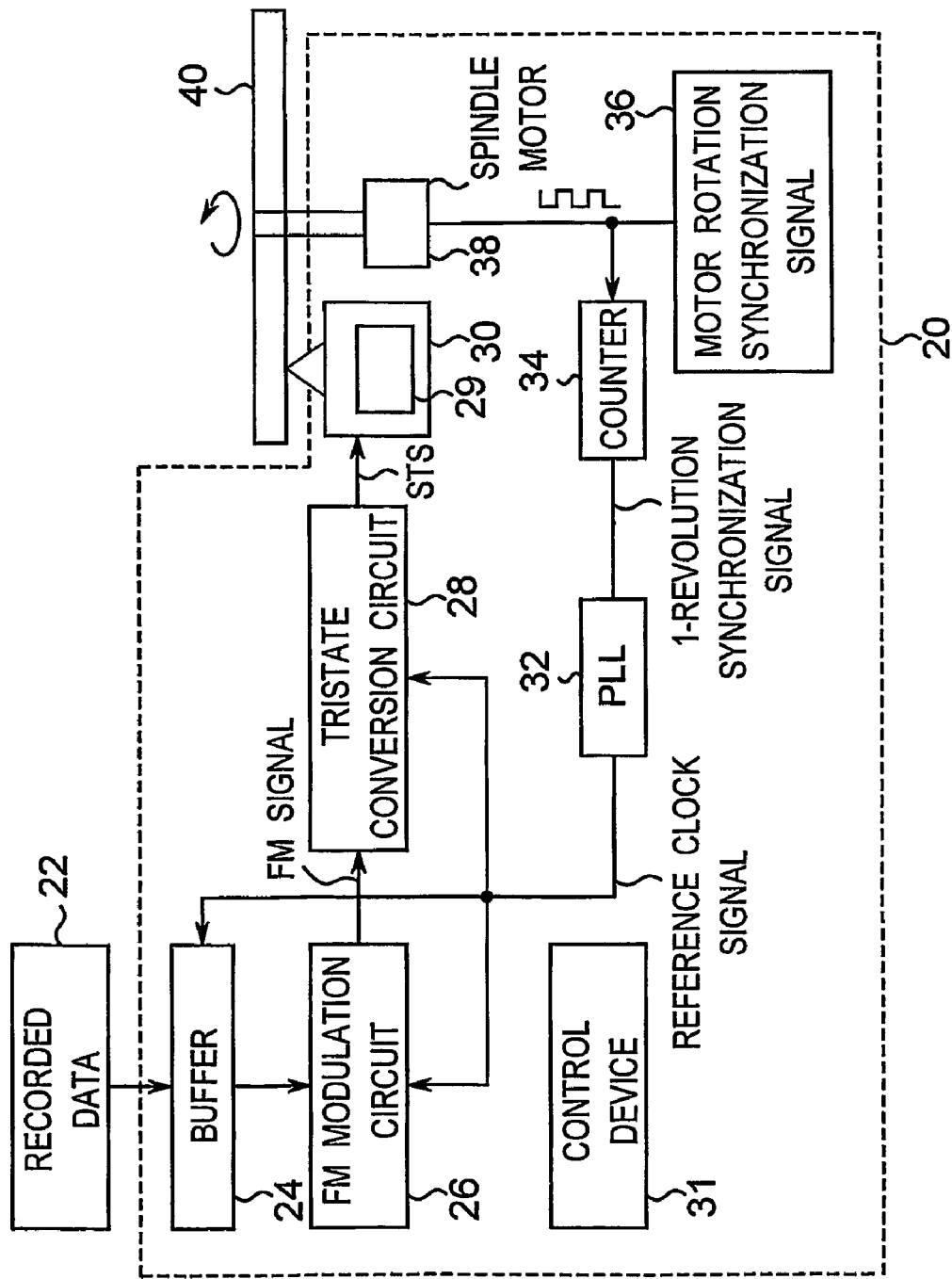
FIG. 5 is a block diagram showing the configuration of a data recording apparatus for recording data to an optical disc medium according to a first embodiment of the present invention.

A data recording apparatus for recording data to this optical disc medium is described next using FIG. 5. This data recording apparatus 20 converts data signal 22 to a tristate wobble signal and displaces optical head 30 according to this wobble signal to form wobble patterns corresponding to the wobble signal in the track groove of the optical disc medium. More specifically, this data recording apparatus 20 has a signal conversion channel for converting from data signal 22 to the tristate wobble signal, and a rotational drive channel for rotationally driving the optical disc medium and generating the synchronization signal. The former signal conversion channel has a buffer 24 for holding the data signal 22, an FM modulation circuit 26 for frequency modulating the buffered data signal 22 to generate an FM signal, a tristate conversion circuit 28 that is the wobble signal generating circuit for converting the FM signal to the tristate wobble signal, an optical head displacement unit 29 for displacing the optical axis of the optical head 30 according to the tristate wobble signal, and an optical head 30 for emitting light corresponding to the wobble signal to the optical disc medium 40 to form wobble pattern parts corresponding to the wobble signal on the track groove. The latter rotational drive channel has a spindle motor 38 for rotating the optical disc medium 40, a rotational synchronization signal generator 36 for this spindle motor 38, a counter 34 for counting this rotational synchronization signal, and a PLL 32. Both channels are synchronized by synchronization signals output from the PLL 32 to the buffer 24, FM modulation circuit 26, and tristate conversion circuit 28. The rotational angular velocity of optical disc medium 40 rotation and the time interval of the reference signal for recording data with the optical head 30 are selected to satisfy a specific relation as described in detail in the data recording method described below. It should be noted that the buffer 24, FM modulation circuit 26, tristate conversion circuit 28, optical head displacement unit 29, optical head 30, PLL 32, counter 34, rotational synchronization signal generator 36, and spindle motor 38 can be controlled with a control device 31.

Figures 9A, 9B:
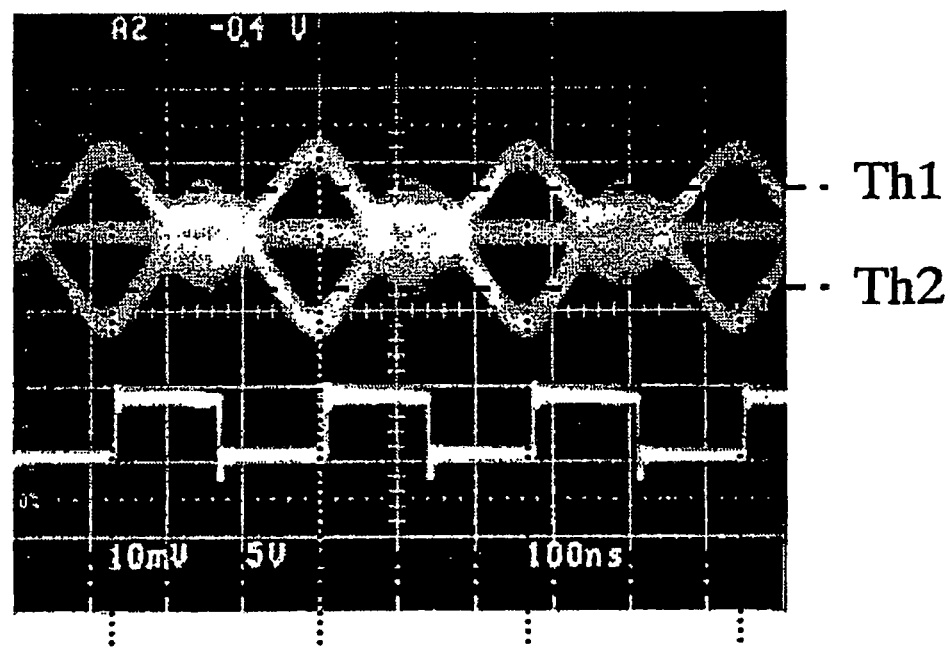
FIG. 9A is a photograph of the playback waveform obtained from the wobble pattern of the track groove in an optical disc medium according to the first embodiment of the present invention.
FIG. 9B is the waveform of the reference clock signal.

It is therefore possible to form wobble patterns according to the wobble signal to the track groove of the optical disc medium 40, and to provide a specific phase difference in the period of the wobble patterns in adjacent track grooves. Because the parts recording signals to the track grooves can be mutually offset, crosstalk from adjacent track grooves in the data recording parts can be suppressed as shown in the photograph of a playback signal in FIGS. 9A and 9B. It should be noted that FIG. 9A is the playback signal waveform and FIG. 9B is the waveform of the reference signal. In FIG. 9A the triangular peaks are data recording parts 42, and the nodes in between are the flat wobble parts where data values are not recorded. The peaks are clearly defined because there is substantially no crosstalk. The effects of crosstalk from adjacent track grooves can be seen in the nodes, but this is not a problem because information is not recorded to these crosstalk parts 44.

Two detectors for detecting reflected light, i.e., a first detector at the inside circumference side of the optical disc medium and a second detector on the outside circumference side, and a differential circuit for obtaining the difference between the strength of the reflection detected by the second detector and the strength of the reflection detected by the first detector can be used as a data playback device for reproducing information in the wobble patterns formed to the track grooves of this optical disc medium. When a laser beam spot 16 for playback is emitted to the track groove 12 of this optical disc medium and the difference between the strength of the reflections detected respectively by the first and second detectors is determined, the three different wobble patterns can be differentiated. More specifically, if the reflected beam strength detected by the second detector is greater than the reflected beam strength detected by the first detector, the wobble is a positive pulse wobble, and if the opposite is the case the wobble is known to be a negative pulse wobble. If the difference is substantially zero, it is known to be a flat wobble. It should be noted that this data playback apparatus shall not be limited to this configuration.

Figure 6:
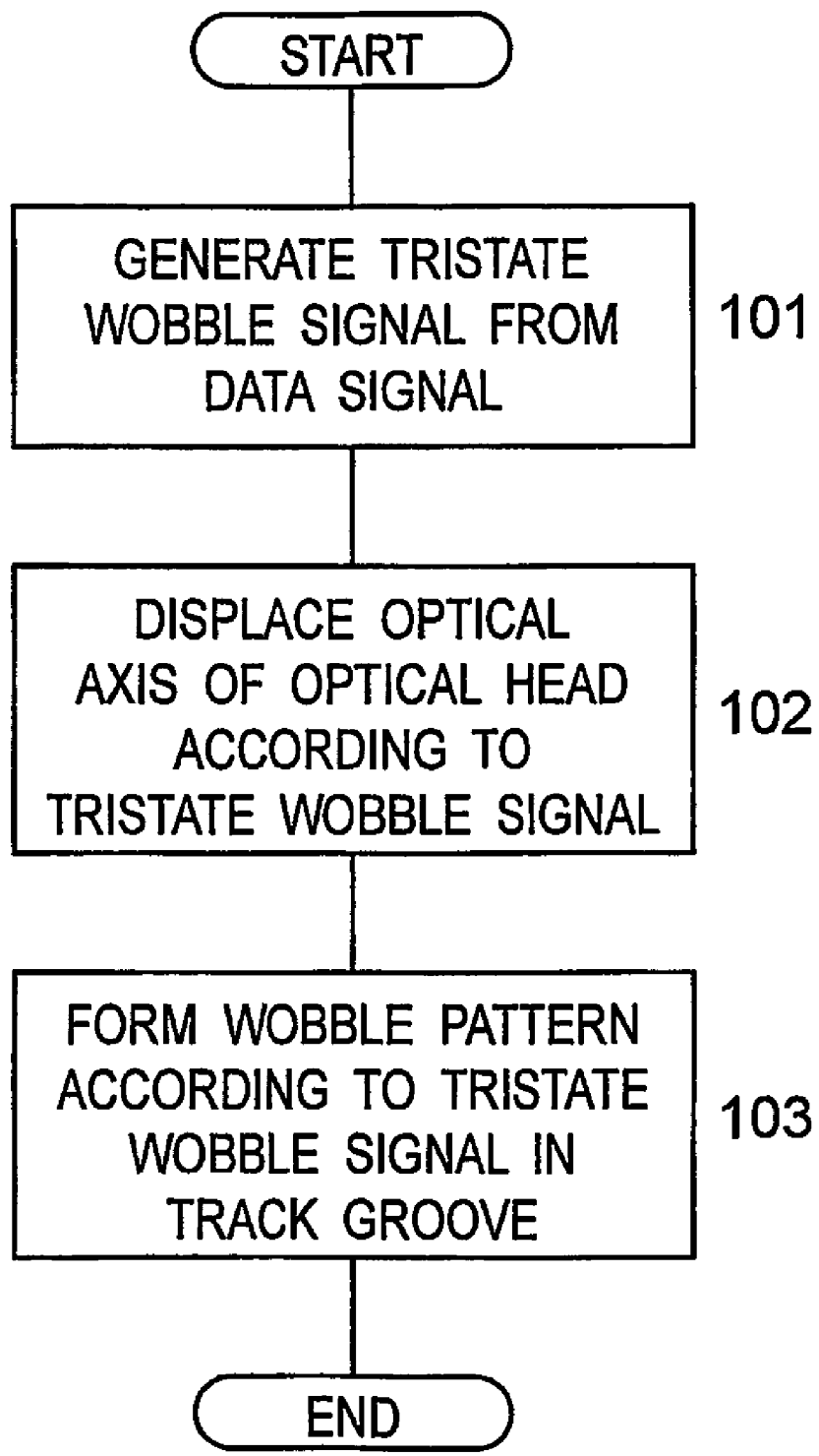
FIG. 6 is a flow chart of a method for recording a data signal to an optical disc medium.

A data recording method for recording data to this optical disc medium is described next using FIG. 6 to FIG. 8. A method for converting the data signal to the tristate wobble signal in the track groove of this optical disc medium, and forming a wobble pattern corresponding to the wobble signal in the track groove, is described using the flow chart in FIG. 6. It should be noted that this data recording method can operate a computer, for example, as the control device 31 controlling the various components of the data recording apparatus.

(1) A tristate signal (Signal of Tristate: STS) that is either a positive pulse continuing for a specific time from the rise of the signal, a negative pulse continuing for a specific time from the fall of the signal, or a flat part between pulses indicating a place where there is no change in the signal, is generated from the data signal 22 by the tristate conversion circuit 28, which is a wobble signal generating circuit (101). The two values of "1" and "0" are used here as the data signal in FIG. 2A. Furthermore, as shown in the FM signal in FIG. 2B, for example, a "1" has a rising edge and a falling edge, but a "0" has only a rising edge or a falling edge.

(2) The optical head displacement unit 29 then displaces the optical axis of the optical head 30 to the optical disc medium according to the generated tristate wobble signal (102).

(3) Light is emitted by the optical head 30 to the optical disc medium 40 according to the wobble signal to form a wobble pattern in the track groove according to the tristate wobble signal (103). It should be noted that a material enabling a wobble pattern to be formed by emitting light is used in the track groove part of the optical disc medium.

The wobble signal generating the wobble signal is described further in detail. This wobble signal generating generates a tristate wobble signal according to the data signal state as shown in FIG. 2C and described below.

(a) A positive pulse with positive amplitude and a specific pulse width is generated where the data signal rises.

(b) A negative pulse with negative amplitude and a specific pulse width is generated where the data signal falls.

(c) A reference signal with zero amplitude is generated where the data signal does not change.

The pulse width of the positive and negative pulses is preferably greater than or equal to the track groove width and less than or equal to ¼ period of the reference signal recorded to the wobble pattern part of the track groove. In the original FM signal substantially all of each period is used as the data recording parts as shown in FIG. 2B, but the data recording parts can be narrowed by thus focusing on the rising and falling edges to generate positive and negative pulses with a short pulse width as shown in FIG. 2C. Because this pulse width cannot be made shorter than the beam diameter used for recording, that is, the width of the track groove, the minimum pulse width is the width of the track groove. More specifically, because the track groove width is approximately 160 nm, for example, a pulse width of 160 nm or greater is preferable. Furthermore, if the pulse width exceeds ¼ period of the reference signal, data recording parts will be adjacent in adjacent tracks, and the pulse width is therefore preferably less than or equal to ¼ of the reference signal period.

Furthermore, as shown in FIG. 2C and FIG. 2D, the phase difference of the wobble signal forming the wobble patterns in adjacent track grooves is preferably greater than or equal to the pulse width of the positive and negative pulses, and less than or equal to ¼ period of the reference signal recorded to the wobble pattern part. By thus setting the phase difference of the wobble signal within a specific range for adjacent track grooves, the data recording parts can be mutually offset in adjacent tracks and crosstalk can be suppressed.

Figure 7:
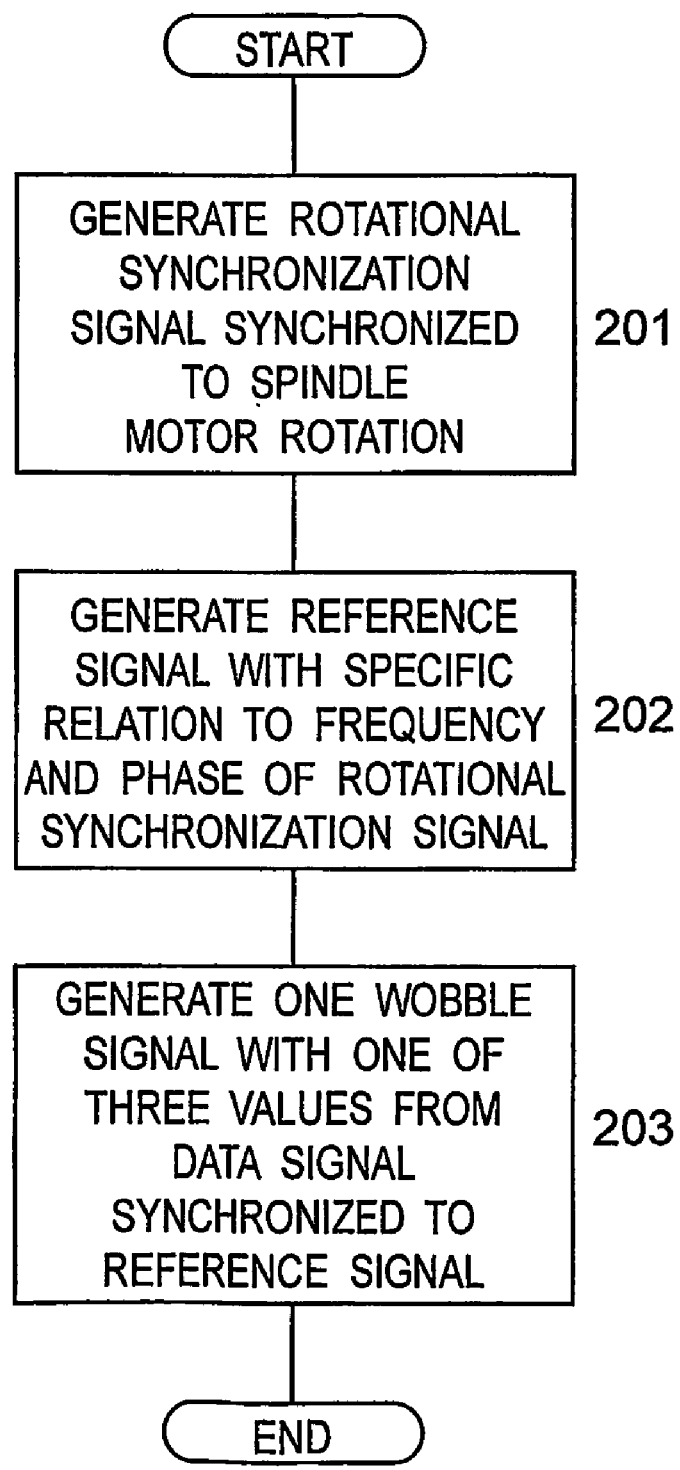
FIG. 7 is a flow chart showing the specific phase difference in adjacent track grooves during conversion to the tristate wobble signal.
Figure 8:
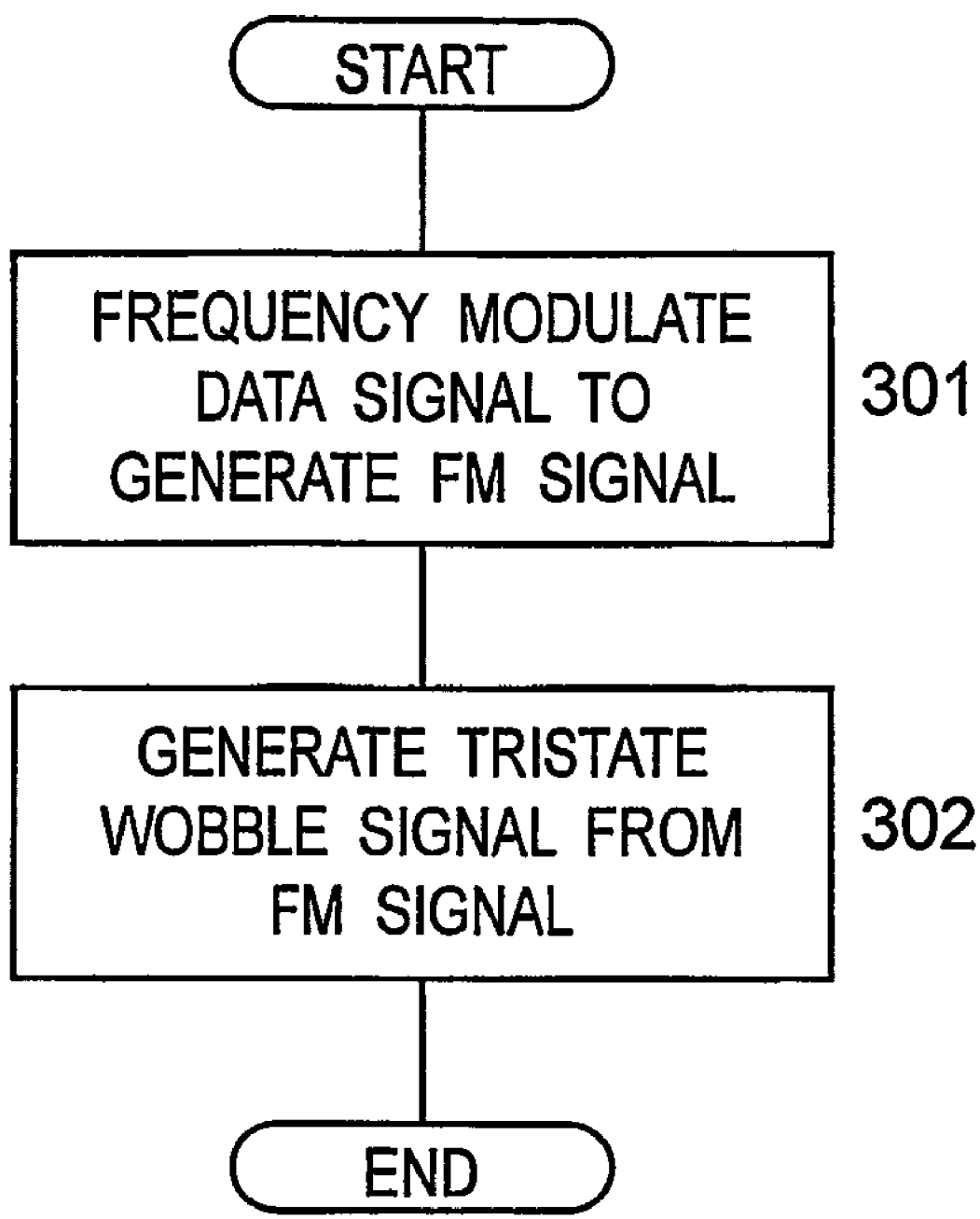
FIG. 8 is a flow chart showing a method first frequency modulating the data signal to obtain the FM signal.

A method for setting the specific range of the wobble signal phase difference when forming the wobble patterns in adjacent track grooves is described using the flow chart in FIG. 7.

(1) A rotational synchronization signal synchronized to rotation of the spindle motor 38 driving the optical disc medium is generated (201).

(2) A reference signal with a frequency and phase in a specific relationship to the rotational synchronization signal 36 is generated (202).

(3) The tristate conversion circuit 28 generates a tristate wobble signal from the data signal synchronized to the reference signal (203).

Conditions for generating a wobble signal synchronized to the above reference signal are described below. If the length of one period of the reference clock signal is T (mm) and the track length of one revolution of the optical disc medium is R (mm), the length T of one period of the reference clock signal is preferably selected so as to satisfy the next relation (1)

$$R = \left(n + \frac{1}{4}\right) \times T. \qquad (1)$$

By thus selecting the length T of one period of the reference clock signal the phase of the wobble patterns formed to adjacent track grooves can be offset ¼ period, that is, 90°, when the optical disc medium rotates one revolution.

More specific conditions are described for a constant angular velocity (CAV) format optical disc medium with a constant angular velocity $\omega$. The conditions for obtaining a phase difference within a specific range at adjacent positions on the inside circumference side and outside circumference side of one revolution of the spiral when recording data at angular velocity $\omega$ to a track at radius r are also considered. First, because the time required for one revolution is $2\Pi/\omega$ (second), the number of cycles that can be recorded in one revolution is $2\Pi/(\omega t_0)$ where $t_0$ (second) is the data recording reference time.

$$T = \frac{R}{\left(\frac{2\pi}{\omega \cdot t_0}\right)} = r\omega \cdot t_0 \quad (2)$$

Relation (1) can then be restated using relation (2) and R=2Πr to obtain the next equation (3) describing the relationship between the angular velocity ω of optical disc medium rotation and reference time $t_0$ for recording data.

$$n = \frac{2\pi}{\omega \cdot t_0} - \frac{1}{4} \quad (3)$$

where because n is an integer, rotational angular velocity ω of the optical disc medium and data recording reference time $t_0$ (or the inverse, frequency $v_0$) must be selected so that the right side of relation (3) is an integer. By setting angular velocity ω and the reference time $t_0$ to satisfy relation (3), a phase difference of ¼ period, that is, 90°, can be provided in the wobble patterns of adjacent track grooves. As a result, crosstalk from adjacent tracks can be suppressed.

The next relation (4) can be derived by rewriting relation (3) using the phase difference δ provided between adjacent track grooves as the unit period for wobble pattern formation.

$$n = \frac{2\pi}{\omega \cdot t_0} - \delta. \quad (4)$$

A phase difference δ can be provided between adjacent track grooves by setting the rotational angular velocity ω and data recording reference time $t_0$ to satisfy this relation (4). As a result, an appropriate phase difference between adjacent track grooves can be provided according to the pulse width of the wobble pattern formed in the track grooves.

A method for first frequency modulating data signal 22 to obtain a FM signal and then converting from the FM signal to a tristate wobble signal is described next using the flow chart in FIG. 8.

(1) The data signal 22 is frequency modulated by the frequency modulation circuit 26 to generate the FM signal (301).

(2) A tristate wobble signal (STS) having a positive pulse continues for ¼ period from a rising edge in the FM signal, a negative pulse continues for ¼ period from a falling edge in the FM signal, or a flat period between pulses indicating no change in the FM signal is generated by the wobble signal generating circuit 28 from the generated FM signal (302).

It should be noted that conversion from the data signal to a tristate wobble signal shall not be limited to using an FM signal as noted above, and it is also possible to convert from the data signal to various other intermediate signals.

Figure 4B:
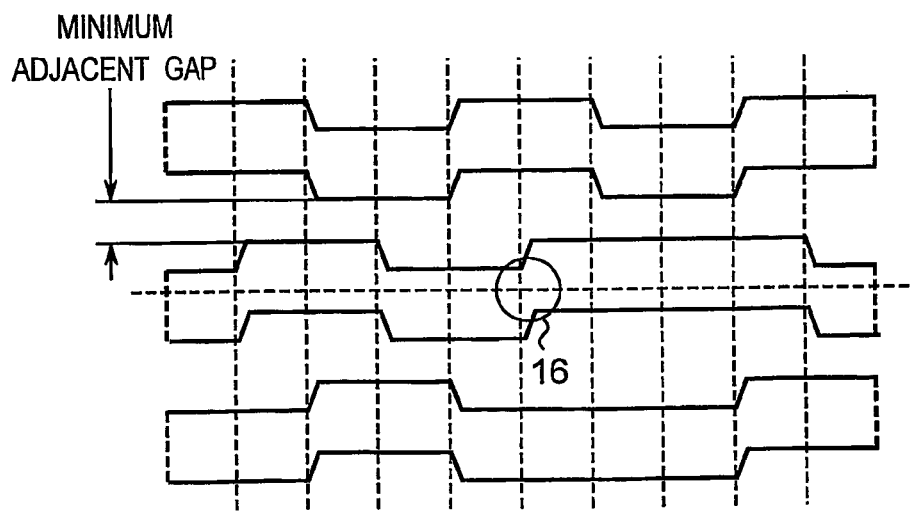
FIG. 4B is an enlarged view for reference of a wobble pattern formed to the track groove using the FM signal as shown in FIG. 2B.
Figure 4C:
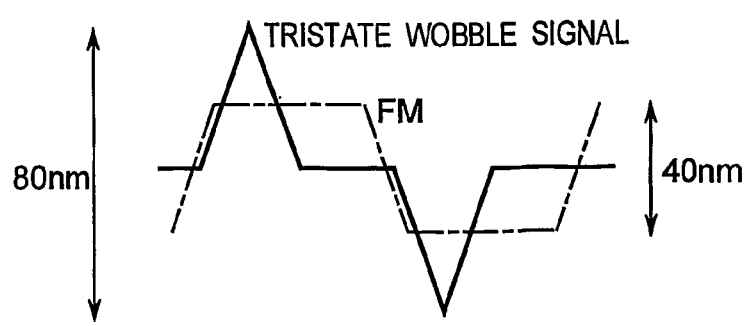
FIG. 4C is a comparison of the amplitude of positive and negative pulses obtained using the tristate wobble signal and the amplitude when using the FM signal.

The shape of the track groove obtained by a data recording method forming three wobble patterns using this tristate wobble signal are shown in FIG. 4A, and wobble patterns formed in the track groove using the frequency modulated FM signal as the wobble signal are shown in FIG. 4B. Because the pulse width of the data recording parts is narrowed between adjacent track grooves and the pulses are shifted by providing a specific phase difference with the data recording method according to this embodiment of the invention shown in FIG. 4A, an amplitude of optical head 30 to 50 nm can be achieved in positive or negative pulse wobbles and a 60 to 100 nm amplitude difference between positive and negative pulse wobbles can be achieved while suppressing crosstalk. On the other hand, if the FM signal is used as the wobble signal as shown in FIG. 4B, the amplitude difference for crosstalk suppression is at most approximately 40 nm as shown in FIG. 4C because the data recording parts overlap in adjacent track grooves. With this data recording method it is therefore possible to increase the amplitude difference between positive and negative pulse wobbles while suppressing crosstalk and increase the signal-to-noise ratio by using three different wobble patterns in the track groove and providing a specific phase difference between the wobble patterns in adjacent track grooves.

The tristate wobble signal generated from the FM signal has been described as having positive and negative pulses only at the rising edge and falling edge of the FM signal as shown in FIGS. 2A to 2D by way of example, but the tristate wobble signal shall not be so limited. For example, as shown in FIGS. 10A to 10D, it is also possible to generate a pulse of the same polarity as the preceding pulse in parts where the sign of the FM signal does not change.

The above-described data recording method can also be achieved as a data recording program executable by a computer as the control device. This data recording program can also be stored to a recording medium that can be read by a computer. Portability can be provided by storing to such a computer-readable recording medium, and this data recording program can be easily run by the data recording apparatus. It should be noted that a floppy disk, hard disk, or other magnetic recording medium, CD-ROM, CD-R, CD-RW, DVD or other optical recording medium, MO, MD, or other magneto-optical recording medium, EEPROM, DRAM, flash memory, or other semiconductor recording medium can be used as the computer-readable recording medium.

It should be noted that an optical disc medium recording data to the track groove by means of the above-described data recording method can be directly used. Furthermore, a master, mother, and stamper can be produced as masters of this optical disc medium and multiple optical disc media can be manufactured using this stamper.

Embodiment 2

An optical disc medium according to a second embodiment of the present invention is described using FIGS. 11A to 11D, FIG. 12, FIG. 13A, and FIG. 13B. As shown in FIG. 11C, the wobble pattern part of the track groove in this optical disc medium differs from the wobble pattern part of the track groove in an optical disc medium according to the first embodiment in that it includes two wobble patterns formed based on a sine wave with a single frequency. More specifically, the first wobble pattern has in one period a first pulse with a peak in the outside circumference side direction and a second pulse with a peak in the inside circumference side direction, and denotes a single data value. The second wobble pattern has two consecutive pulse peaks in the same direction, either toward the inside circumference or outside circumference, in the same period, and denotes a second data value. Two different wobble patterns can thus be formed by combining pulse peaks at a single frequency.

Figures 13A, 13B:
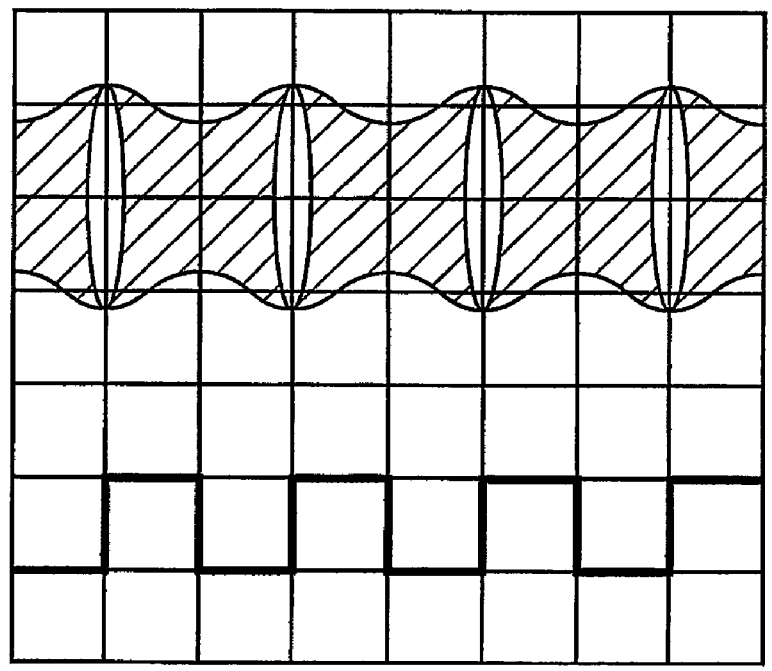
FIG. 13A is schematic view of the playback wave obtained from the wobble pattern of the track groove in an optical disc medium according to a second embodiment of the present invention.
FIG. 13B is a waveform of the reference clock signal.
Figure 14:
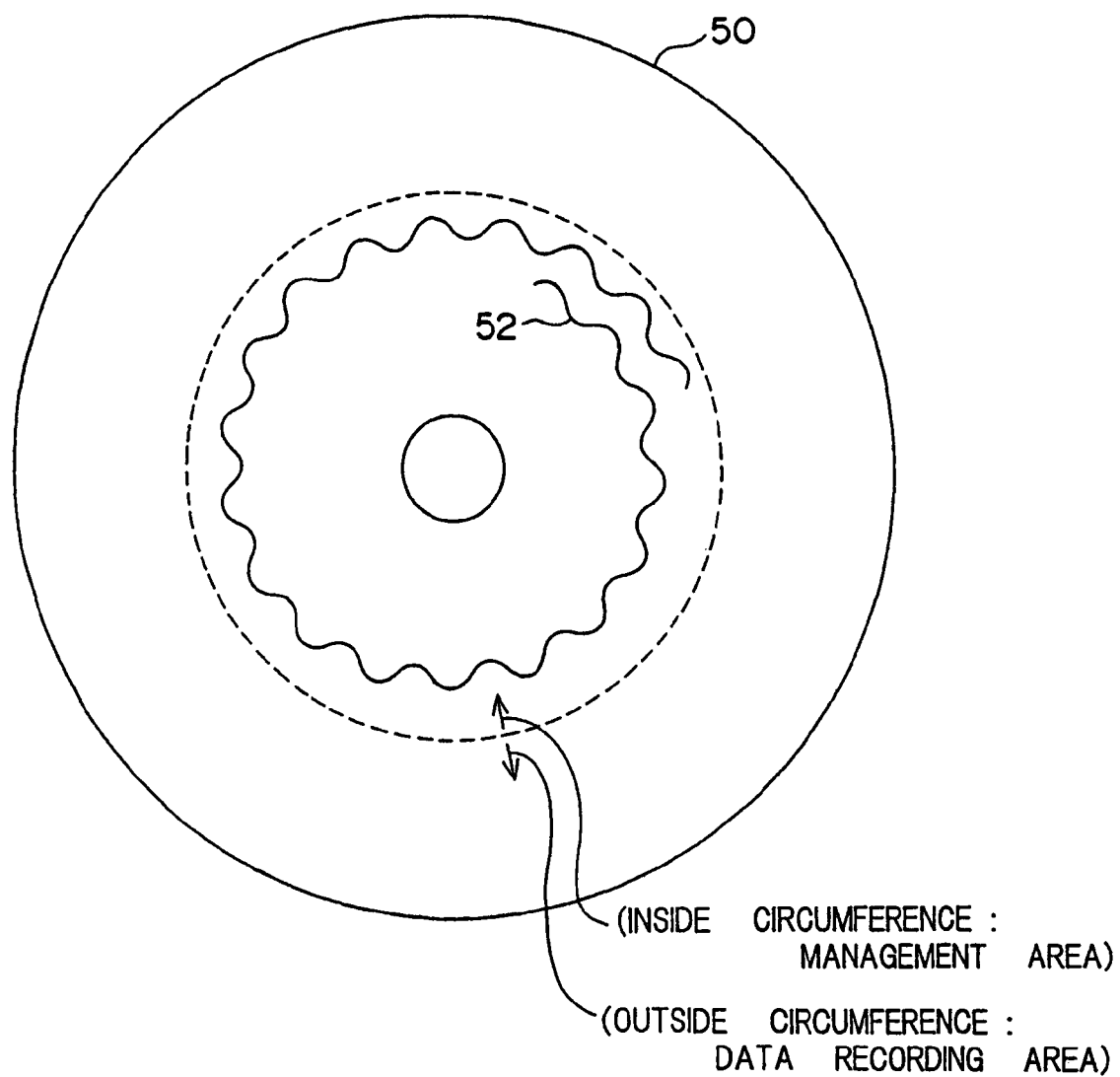
FIG. 14 is a schematic view showing the management area and data recording area of an optical disc medium.

As shown in FIG. 11C and FIG. 11D and in FIG. 12, the phase difference in the wobble pattern parts of a first track groove and an adjacent second track groove is ¼ period, that is, 90°. It is therefore possible to offset the peak positions of the pulses in the adjacent track grooves. Because corresponding locations on adjacent track grooves are always the reference value if peak positions (A), (B), (C), and (D) are read points as shown in FIG. 12, the effect from adjacent tracks is constant and crosstalk can be suppressed. For example, the playback waveform is shown in FIG. 13A and the waveform of the playback reference signal is shown in FIG. 13B. The middle part of this playback wave is the peak part of the wobble pattern and the troughs therebetween correspond to the flat nodes of the wobble pattern. The shaded part of the playback waveform is noise, and the white parts denote where there is little noise. By thus providing a phase difference in the wobble patterns of adjacent tracks, crosstalk can be suppressed.

A data recording method for recording data to this optical disc medium is described next. Compared with the data recording method of the first embodiment, the wobble signal generating of this data recording method forms two different wobble pattern parts corresponding to two data signals, "0" and "1", for example. For a first data signal this method generates a first wobble signal having a first pulse peak in the direction either above or below the reference level, and a second pulse peak either above or below the reference level in the opposite direction. A second wobble signal having two consecutive pulse peaks in the same direction either above or below the reference level is generated for the second data signal. More specifically, the wobble signal generating uses a reference signal of a single frequency to generate the first wobble signal based on the waveform in one period of the reference signal, and generates the second wobble signal based on two consecutive waves of the same sign inverting the sign of different-sign wave parts in one period of the reference signal. Because two different wobble signals can be formed using a reference signal of a single frequency even for signals such as FM signals having multiple frequencies, the configuration of the data recording apparatus can be simplified.

It should be noted that when using a wobble signal with first and second frequencies, an optical disc medium can be manufactured with a first wobble pattern denoting a first value by forming a wobble with a first frequency in a single period, and a second wobble pattern denoting a second value by forming a wobble with a second frequency in a single period. In this case the first value can be detected from the first wobble pattern and the second value can be detected from the second wobble pattern.

The present invention has been described using a CAV method for recording and reading the management area at the inside circumference side, but the recording and reading method of the data recording area at the outside circumference side is not limited to a CAV method. The outside circumference side could be recorded and read using a constant linear velocity (CLV) method, for example.

Although the present invention has been described in connection with the preferred embodiments thereof with reference to the accompanying drawings, it is to be noted that various changes and modifications are apparent to those skilled in the art. Such changes and modifications are to be understood as included within the scope of the present invention as defined by the appended claims, unless they depart therefrom.

The invention claimed is:

1. An optical disc medium having a wobbled track groove comprising:
   a flat wobble pattern in which the amplitude of the wobble from the lengthwise direction of the track groove is zero such that the track groove is flat;
   a positive pulse wobble pattern in which the amplitude of the wobble from the lengthwise direction of the track groove is positive such that the track groove is wobbled in a first direction perpendicular to the lengthwise direction; and
   a negative pulse wobble pattern in which the amplitude of the wobble from the lengthwise direction of the track groove is negative such that the track groove is wobbled in a second direction opposite to the first direction;
   whereby three data values are recorded using three distinctive wobble patterns; and
   wherein the pulse width of the positive pulse wobble pattern and the negative pulse wobble pattern is greater than or equal to the track groove width and is less than or equal to ¼ period of a reference signal recorded to the track groove wobble pattern.

2. An optical disc medium having a wobbled track groove comprising:
   a flat wobble pattern in which the amplitude of the wobble from the lengthwise direction of the track groove is zero such that the track groove is flat;
   a positive pulse wobble pattern in which the amplitude of the wobble from the lengthwise direction of the track groove is positive such that the track groove is wobbled in a first direction perpendicular to the lengthwise direction; and
   a negative pulse wobble pattern in which the amplitude of the wobble from the lengthwise direction of the track groove is negative such that the track groove is wobbled in a second direction opposite to the first direction;
   whereby three data values are recorded using three distinctive wobble patterns; and
   wherein the phase difference of the wobble patterns of adjacent first and second track grooves is greater than or equal to the pulse width and is less than or equal to ¼ period of the reference signal recorded to the wobble pattern.

* * * * *